United States Patent

[11] 3,599,092

| [72] | Inventor | Herbert William Silverman |
| | | Sudbury, Mass. |
| [21] | Appl. No. | 18,916 |
| [22] | Filed | Mar. 12, 1970 |
| | | Division of Ser. No. 662,360, Aug. 22, 1967, Pat. No. 3,541,440. |
| [45] | Patented | Aug. 10, 1971 |
| [73] | Assignee | RCA Corporation |

[54] KINESCOPE SIMULATOR USED IN CHECKING AN AUTOMATIC TESTING SYSTEM
2 Claims, 6 Drawing Figs.

[52] U.S. Cl. .................................................. 324/158 R,
178/DIG. 4, 324/121 R
[51] Int. Cl. .................................................. G01r 35/00
[50] Field of Search .......................................... 178/5.4 TE,
DIG. 4; 324/72, 73 R, 73 AT, 121, 158 R, 158 F, 28

[56] References Cited
UNITED STATES PATENTS

| 2,848,681 | 8/1958 | McKeige et al. | 324/28 X |
| 3,325,723 | 6/1967 | Grayson | 324/158 X |
| 3,424,958 | 1/1969 | Groat | 324/28 X |
| 3,435,328 | 3/1969 | Allen | 324/158 X |
| 3,518,779 | 7/1970 | Cox et al. | 324/73 X |

*Primary Examiner*—Herman Karl Saalbach
*Assistant Examiner*—Paul L. Gensler
*Attorney*—H. Christoffersen

ABSTRACT: Apparatus which simulates a mass-produced article, such as a color kinescope, and which is employed for the purpose of ascertaining not whether a manufactured article is within manufacturing specifications but instead whether a system which is automatically testing the mass-produced articles is itself operating properly.

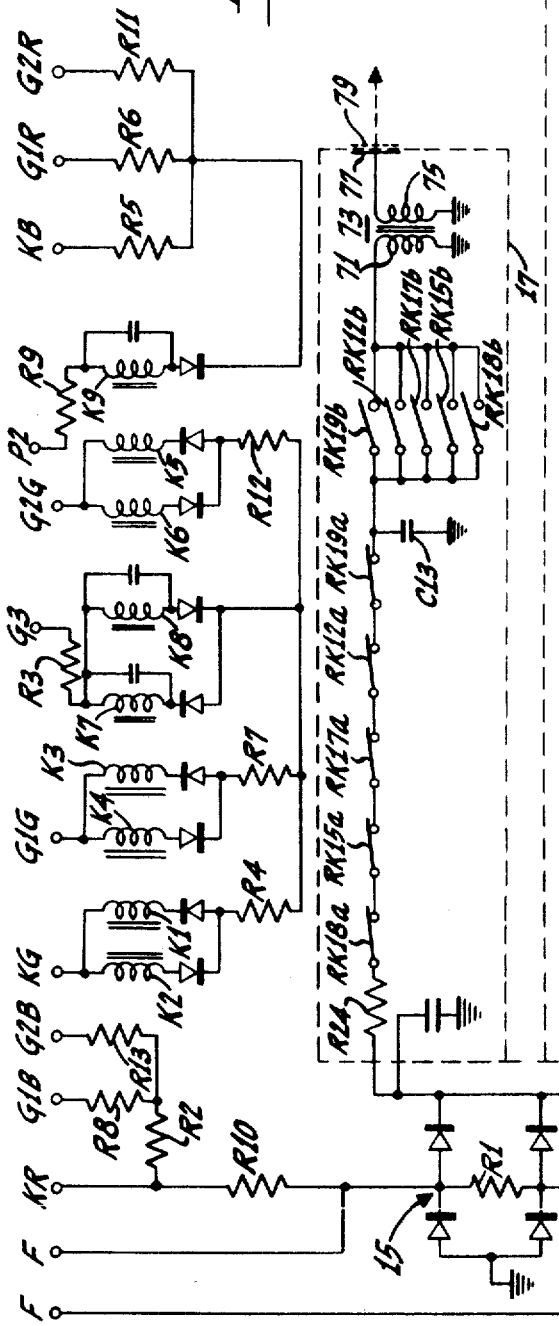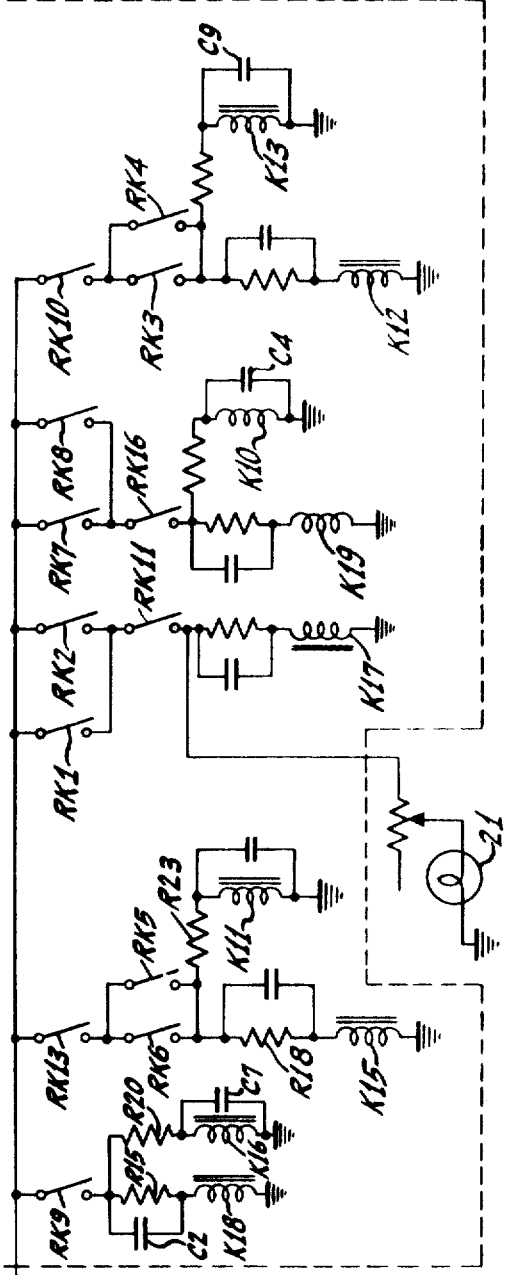
Fig. 2.
INVENTOR
HERBERT W. SILVERMAN
BY *(signature)*
ATTORNEY INVENTOR
HERBERT W. SILVERMAN
BY James Cohen
ATTORNEY 3,599,092

1

KINESCOPE SIMULATOR USED IN CHECKING AN AUTOMATIC TESTING SYSTEM

This is a division of application Ser. No. 662,360 filed Aug. 22, 1967 now U.S. Pat. No. 3,541,440.

Copending application for "Digital Computer Controlled Test System" Ser. No. 653,083 filed on or about July 13, 1967 by Walter Endres Bahls et al., and assigned to the same assignee as the present application, describes a system for automatically testing a mass-produced article such as a color kinescope. The system includes a plurality of test stations, each testing different parameters of mass-produced articles, and all operating under the control of a digital computer of the stored program type. The articles pass along a conveyor system and the different test stations connect to the successive articles automatically and automatically apply programs of stimuli (such as test voltages) to the articles during the time they are moving. During the same period, the system senses signals produced by the articles in response to the applied stimuli, these signals being indicative of whether or not an article is within manufacturing tolerances. In response to these signals, the system indicates which articles have passed and which have failed the tests and, in some cases, the steps which should be taken to repair those articles which have failed.

It is important in a system of the above type which is employed in a production environment that the testing system itself operates properly. The stimuli produced by the test system must remain within certain fixed limits; the switches, relays, and the like which direct the stimuli to the proper points on the article being tested and which route the signals indicative of the parameters being measured to the proper measuring circuits must continue to function properly; the measuring circuits must remain properly calibrated, and so on.

The normal technique employed to insure that a testing system is operating properly is to insert in among the articles being tested a "dummy" or reference article (generally one which is known to be within manufacturing tolerances) and to determine whether the testing equipment provides the correct testing data for that reference article. However, in many applications as, for example, in the testing of the color kinescopes, this solution is not satisfactory. The reason is that the reference kinescope, under continuous testing, may gradually change its operating parameters or, when subjected to successive applications of overvoltages due, for example, to faults in the system, may, within a short time, become damaged or destroyed.

The object of this invention is to provide a new and improved, highly reliable means for testing an automatic testing system.

SUMMARY OF THE INVENTION

A simulator of a kinescope includes: means responsive to a group of signals applied to the simulator for producing outputs representing normal voltages and currents produced by the kinescope in response to such signals; and means responsive to another group of signals applied to the simulator for producing sudden changes in voltage level which, while not causing any arc to be formed, simulates internal arcing in a kinescope.

BRIEF DESCRIPTION OF THE DRAWING

FIG. 2 is a schematic circuit diagram of a kinescope simulator according to the invention;

DETAILED DESCRIPTION

Figure 1:
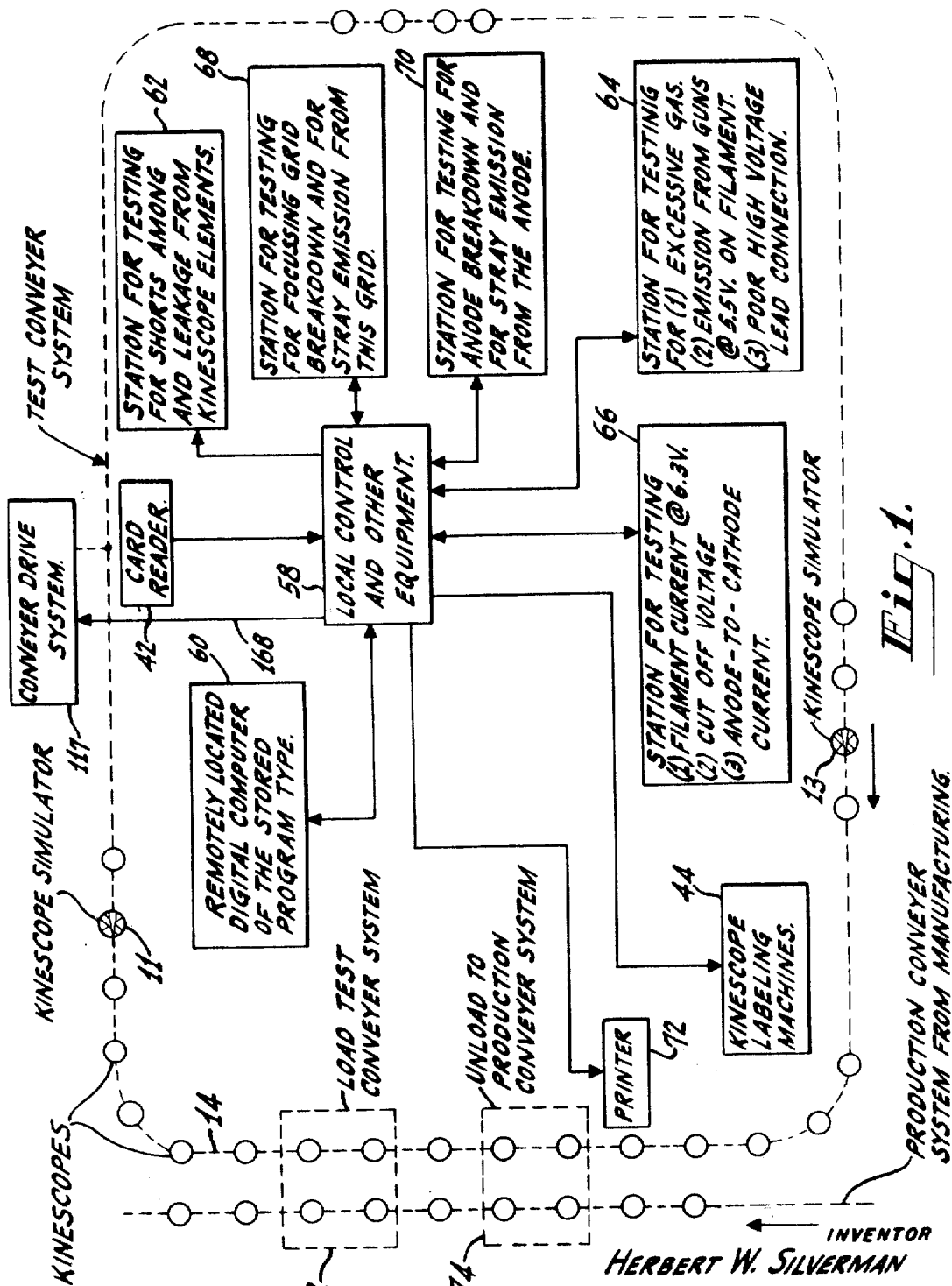
FIG. 1 is a block circuit diagram of a system in which the present invention may be employed.

FIG. 1, which is based on FIG. 1 of the copending application above, shows schematically a plurality of kinescopes on a test conveyor test system 14. Each kinescope has secured thereto a data processing card which has recorded thereon data relating o the kinescope class and type, and to various steps in the kinescope's manufacture, as discussed in the copending application.

When a kinescope reaches the card reader 42, the data processing card is removed from the kinescope and placed in the card reader. In response to the information contained on a card, the digital computer 60 selects a program of tests for the kinescope identified by that card. These tests are performed by the various test stations 62, 68, 70, 64, and 66, as discussed in detail in the copending application. These test stations include means which automatically connect to and move with the successive kinescopes for a limited distance, as the latter move along the test conveyor system. During such movement, the test stations apply stimuli (test voltages) to various elements of the kinescope and voltages or currents appearing at certain other elements of the kinescope, in response to these test voltages, are sensed and measured.

The information sensed at the various test stations is converted to binary information by an analog-to-digital converter within the block 58 and this binary information is compared with binary information stored in the digital computer 60. The object of this comparison is to determine whether or not the sensed kinescope parameters are within manufacturing specifications. If they are, that is, if the kinescope passes all of its tests, one of the kinescope labeling machines 44 so indicates by pasting an appropriate label on the kinescope. If not, another one of the labeling machines pastes a different type of label on the kinescope.

As mentioned in the introduction portion of this application, it is important that the test system itself operates properly. Should any of the stations apply improper voltages to the kinescope elements or should the measuring equipment in the test stations not operate properly, kinescopes which are perfectly good may be rejected by the system. It is also possible, under certain test system improper operating conditions, that kinescopes which are bad will be passed rather than rejected by the system. In addition, under certain circumstances it is possible to destroy a good product due to faults in the test system.

One could, as is done is some other automatic systems, mix with the articles which have never been tested, reference articles known to be good or articles having known faults, to check the operation of the testing system. However, it is found, in practice, that this is not a satisfactory solution in the case in which the article, for example, is a kinescope. One reason is that the continuous application by stations 68 and 70 of overvoltages to the reference kinescope damages or destroys it within a reasonably short time. Another is that under continuous testing by the other test stations, even if the reference kinescope does not become destroyed, its parameters may change sufficiently that they no longer are within desired limits.

In accordance with the present invention, there is placed on the test conveyor system, along with the kinescopes being tested, a number of kinescope simulators such as shown at 11 and 13. In practice, in one such system, there are six such simulators always on the conveyor system and the conveyor size and speed are such that each test station connects to a simulator at ten minute intervals.

Each simulator, one of which is shown in detail in FIG. 2, consists of a group of relays, resistors, and other circuit elements. These are located within a metal casing which is shaped like a kinescope and which has pins corresponding to the pins terminating the neck of a kinescope, and an anode terminal corresponding to the anode terminal of a kinescope. The kinescope pins are adapted to connect to a socket corresponding to socket 45 of FIG. 2 of the copending application and the anode terminal is adapted to connect to a terminal at the end of a high voltage lead corresponding to lead 31 of the copending application. Also, just as in the case of the kinescopes to be tested, each kinescope simulator is identified by a punched card secured to the simulator. Such a card, when placed in the card reader, indicates to the digital computer 60 that there is a kinescope simulator present and, in response to this card, the digital computer 60 selects from its memory a program of tests which are appropriate for testing the successive test stations.

The terminals at the upper part of FIG. 2 correspond to the 13 terminals present on a color kinescope. Twelve of these terminals such as F (filament), KR (the cathode for the red color), G1B (the control grid associated with the cathode for the blue color), G3 (the focusing grid), and so on, are pins located at the end of the neck of the kinescope simulator and the thirteenth, P2, corresponding to the anode terminal of a color kinescope, is located on the side of the simulator.

Figure 3:
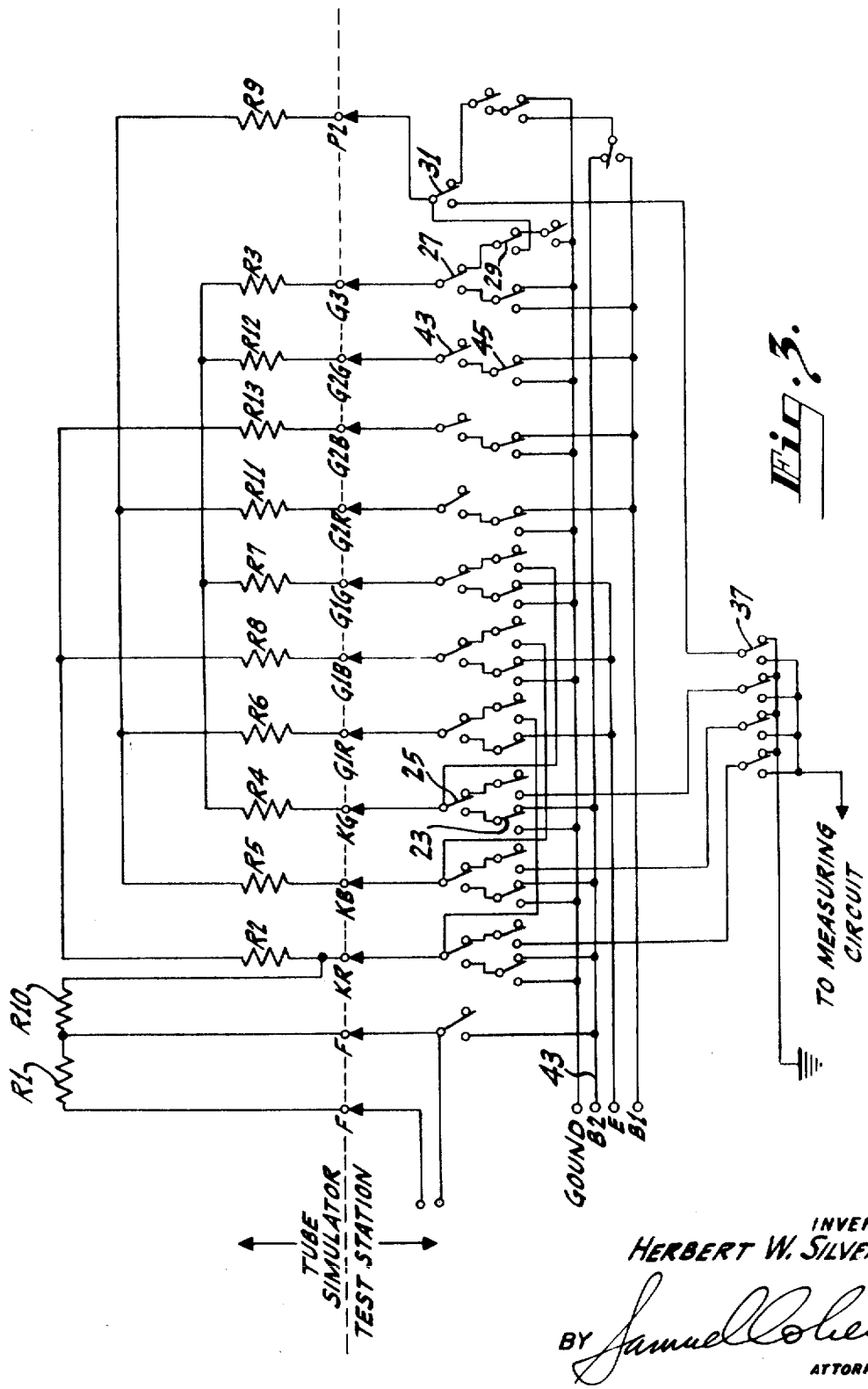
FIG. 3 is an equivalent circuit of the kinescope simulator connected to one of the test stations for testing the operation of that test station.

The resistor R1 simulates the filament of a color kinescope. It is located between two terminals of the bridge rectifier 15 which rectifies the alternating filament voltage (when present) and applies the resulting direct voltage to the circuits shown. (At some of the test stations, a direct current rather than an alternating current is supplied to filament terminals F and at these stations resistor R1 simply simulates the filament resistance and the bridge rectifier plays no part in the simulator operation. This is discussed later.) The circuits within dashed block 17 are for the purpose of simulating high voltage arcs (one form of improper kinescope operation); the circuits within dashed block 19 are for the purpose of closing and opening the relay contacts within dashed block 17 in a particular sequence; the purpose of lamp 21 is to simulate emission of light from certain of kinescope electrodes (another form of improper kinescope operation); and the purpose of other circuits in FIG. 2 will be discussed shortly FIG. 3 shows the kinescope simulator connected to a test station such as 64 (FIG. 1) and the explanation which follows shows, by way of example, how the simulator checks the operation of certain relays in the test station. The tube simulator is shown only in part above the dashed line and only in equivalent circuit form. The reason the relay coils and diodes are not shown is that they act simply as short circuits when checking relay operation of this type of test station. The portion of FIG. 3 below the dashed line represents circuits within the test station 64.

Figure 6:
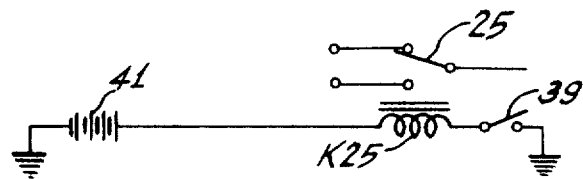
FIG. 6 is a schematic drawing of a circuit within the automatic test equipment.

To start with, the computer program for the simulator causes the B2 supply voltage to be set to a value of 500 volts. This voltage is applied from the B2 terminal and conductor 43 to the normally closed relay contacts 23. The computer program now commands the relay contacts 25 to close. This may be done for this relay and for the others discussed, in the manner shown schematically in FIG. 6. The relay coil K25 within the test station is in series with a switch, shown schematically at 39, and a source of voltage, shown as battery 41. The switch 39 may be a semiconductor device or the contact of another relay or any other equivalent means. In responses to an instruction step of a program stored in the memory of the computer, this switch is closed, the relay K25 is actuated and the relay contacts 25 close.

Next, in response to other instruction steps, the relay contacts 29, 31 and 37 are closed. If now the relays which control contacts 25, 29, 31 and 37 are operating properly, current flows from the B2 supply through these contacts to the measuring circuit (not shown) for the test station. Resistors R4 (39 kilohms) and R3 (5 megohms) are in series with this current path so that the amount of current which flows is equal to approximately $(5\times10^2 \text{ volts})/(5\times10^6 \text{ ohms}) = 100$ microamperes. This current is measured in the manner discussed in the copending application, namely by converting it to a binary word and comparing this work with a word stored in the computer memory. If a current of the proper value is sensed by the measuring circuit of the test station, this is an indication to the computer that the relays mentioned are operating properly and that the voltage supplied by the B2 supply is of the correct value, and that the measuring circuit is operating properly. If not, then something is wrong.

Suppose, in response to the program steps above, rather than detecting 100 microamperes, the measuring circuit detects no current. In response to this condition, the computer program causes the equipment to cycle through a relatively simple diagnostic set of operations to determine which circuit component is faulty. For example, assume that the fault is in the relay controlling contact 25 or in the contacts 25 themselves. The computer program may, in diagnosing this fault, call for the following steps. It may turn off the B2 supply and turn on the B1 supply and then cause the relay contacts 43 to close and maintain the relay contacts 29, 31 and 37 closed. Now, if the circuit is operating properly, current will flow from the B1 supply through normally closed contacts 45, through presently closed contacts 43, through resistors R12 and R3, through the relay contacts 27, 29, 31 and 37 to the measuring circuit. The amount of current flow will depend upon the voltage to which the B1 supply is set and the values of resistors R12 and R3. If this precalculated amount of current does flow, as determined in the manner already described, it is an indication that in the first test made, the relay which controlled contacts 25 was not operating properly. The computer may be programmed, in response to these two tests, automatically to print out, on the printer associated with the computer, that relay 25 is not operating properly.

On the other hand, in response to the first test mentioned above, the measuring circuit, rather than indicating that 100 microamperes are present, may instead measure only 50 microamperes. This may mean that the B2 supply is supplying 250 volts rather than the 500 volts called for or that the scale of the measuring circuit is incorrect or that the measuring circuit is operating improperly. Again, by a number of simple diagnostic tests, the actual circuit which is operating improperly readily may be ascertained. As one example, the measuring circuit may be employed to measure the known current which flows from another supply, such as the B1 supply, to determine whether the measuring circuit is operating properly. If it is, then this may indicate that the B2 supply voltage was incorrect. As another example, the B2 supply may be checked by routing the current it provides through a different set of relays and resistors to a different measuring circuit.

The operation illustrated above is merely given by way of example. In practice, the computer program is such that all of the relays in the test stations may be tested for proper operation. The program permits a certain amount of diagnosis "on line" and, in more complicated cases, where the diagnosis may take a longer time than is available during the period the test station is connected to the kinescope simulator, the diagnosis may be made "off line." The online tests involve the comparison of binary words indicative of system performance with binary words stored in a table in the computer memory and they are performed during the time the tube simulator is moving along the conveyor. If during the comparison above, a failure of the test system is indicated which requires a more detailed analysis, the computer signals the local control equipment 58 (FIG. 1) and the latter, via cable 168, inactivates the conveyor drive system 117. The simulator is still in the test station at this time and the computer now completes its off-line functions and supplies the results of its analysis to the printer which then prints out the component of the test system which is at fault.

During the time the kinescope simulator is present at a time shared station such as 62, the filament voltage applied to the terminals F of the simulator is a direct voltage rather than an alternating voltage. The resistors R10, R2, R8 and R13 (FIG. 2) are employed during the application of this direct voltage to simulate the resistance between filament and cathode KR, between control grid G1B and cathode KR and so on. In other words, these resistors permit the performance of the measuring circuits at a test station such as 62 to be checked.

As explained in the copending application, at the stations 68 and 70 of FIG. 1, the kinescopes are tested for arcing and for stray light emission. The tube simulator includes circuits for simulating such arcing and stray emission.

Figure 4:
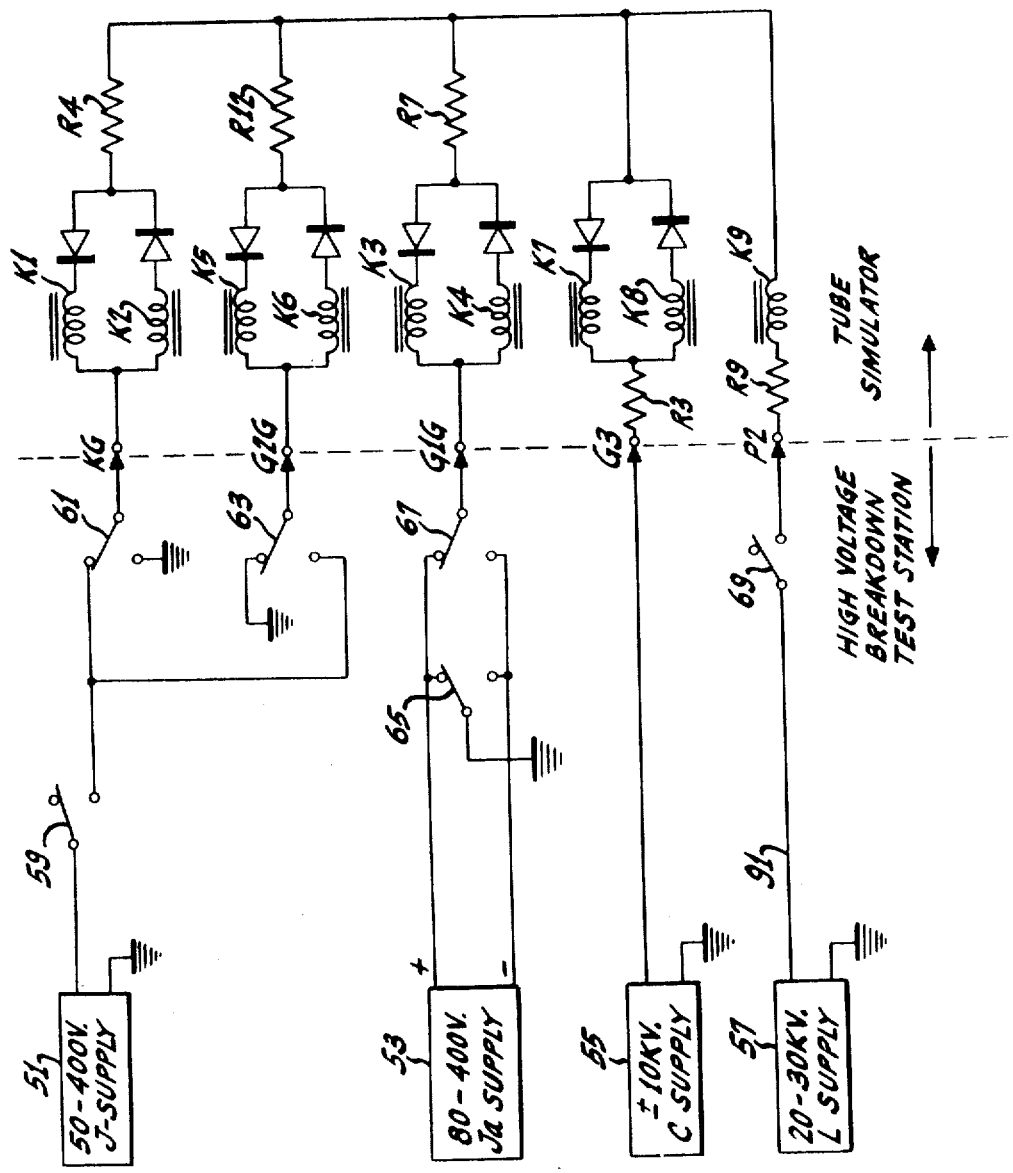
FIG. 4 is a schematic drawing of a portion of the kinescope simulator connected to a high voltage breakdown test station.

There is located within the station 70 (and similarly within station 68 of FIG. 1) power supplies such as 51, 53, 55 and 57 (FIG. 4). These supplies are controlled by the computer which programs them to apply to the simulator, predetermined values and polarities of stimuli. That is, a specific value of voltage to be supplied by power supply 55, which is capable of providing anywhere from −10 kv. to +10 kv., is selected by the stored program; a specific value of the voltage to be supplied by power supply 57, which is capable of providing anywhere between 20 kv. to 30 kv. is selected by the program, and so on.

The relay contacts 61 and 63 are for the purpose of connecting the power supply 51 to the terminals KG and G2G for the "green" cathode and second grid, respectively. If neither relay (neither the one for contacts 61 or for contacts 63) is energized (the relay contacts are as shown), the positive voltage provided by supply 51 can be applied to terminal KG and terminal G2G remains grounded through relay 63. On the other hand, if the relays controlling contacts 61 and 63 are both energized, terminal G2G receives the positive voltage of supply 51 through contacts 63 and terminal KG becomes grounded through relay contacts 61. These two terminals are never grounded at the same time since at this test station the cathode and second grid of a kinescope under test are never grounded at the same time. In practice, the relays for contacts such as 61 and 63 are controlled approximately 3 152 seconds before a kinescope under test (or the simulator) enters the test station and before the relays for contacts such as 59, 65 and others are actuated.

When a kinescope under test becomes connected to a test station such as 70, voltages are supplied to the various kinescope electrodes in the following way. First, the relay contacts 59 close and power supply 51 applies positive voltage either to terminal KG or to terminal G2G in the manner described above. Next, either the relay for contacts 65 or relay for contacts 67 becomes energized so that power supply 53 applies either a positive or a negative voltage to the G1G terminal. If the relay for contacts 65 is energized, the negative terminal of power supply 53 becomes grounded and a positive voltage is applied to terminal G1G. If the relay for contacts 67 becomes energized, the power supply 53 applies a negative voltage to terminal G1G. Next, a relay within power supply 55 closes permitting this supply to apply voltage to terminal G3. Finally, the relay for contacts 69 becomes energized and supply 57 applies voltage to terminal P2.

When relay contacts 63 are in the position shown, the relay K5 or K6, depending upon the voltage polarity, serves as a return path to ground for the current flowing from the power supplies and, in the process, one of these relays becomes energized. When the relays controlling contacts 61 and 63 are energized, relays K1 and K2 serve the same purpose and one of these relays becomes energized. There is no ground in the simulator itself and its shell is "hot"— is at a high value of voltage when in place at a test station such as 70.

When the tube simulator is in position, each time one of the pairs of relay contacts such as 59, 65 and so on in the test station close, a power supply applies a voltage to a terminal of the tube simulator. The value of this voltage does not settle down and become stable until all of the relays such as those for contacts 59, 69, and so on are energized. Due to this fact, since relay 69 within the test station becomes energized last, its action is employed to initiate a timing cycle within the simulator as discussed in detail below.

FIG. 2 should now be referred to. The actuation of relay K9 (upper right of FIGURE) causes its contacts RK9 (lower left of FIGURE) to close and direct current to be applied to the parallel paths containing relays K18 and K16. The relative values of the resistors and capacitors in this circuit are such that relay K18 is actuated first and, after a short time, it becomes disabled and relay K16 becomes energized and remains energized. Resistor 15 is of relatively high value and resistor R20 is of relatively low value. When the relay contacts RK9 close, current initially flows through the relatively low impedance presented by capacitor C2 to relay K18 and energizes the same.

Current also initially flows through the path containing resistor R20, however, capacitor C7 acts as a low impedance bypass for relay K16 so the latter does not become energized. Within a relatively short interval, capacitors C2 and C7 become charged. Now the path containing resistor R15 and relay K18 is a high impedance path and insufficient current flows to maintain relay K18 energized so that it becomes disabled. On the other hand, resistor R20 has a relatively low value compared to resistor R15 and C7 has charged enough so that sufficient current now flows through the path containing resistor R20 and relay K16 to energize the latter. Relay K16 thereafter remains energized for as long as relay K9 is energized.

The center portion of FIG. 2 should now be referred to. The a surface applies direct current through resistor R24 and the normally closed relay contacts shown, to capacitor C13, charging the same. The relay contacts RK19b, RK12b, and so on are all open so that the capacitor C13 cannot discharge through any of covered by contacts.

When relay K18 is energized (it remains energized for approximately 600 milliseconds in one particular embodiment of the invention), its contacts RK18a open and its contacts RK18b close. The capacitor C13 now discharges through relay contacts RK18b into the primary winding 71 of transformer 73.

Transformer 73 is a step-up transformer and a relatively high voltage develops across its secondary winding 75. This voltage is applied to the plate 77. This sudden high voltage simulates an arc in a color kinescope and is picked up by the arc sensing equipment at the test station. The pickup means for this are sensing equipment is schematically shown by the dashed line 79 in FIG. 2. (As explained in the copending application, this pickup means 79 is connected to a counter within the test station. The count accumulated by the counter in a given time interval is applied to the computer 60.)

It should be mentioned, in passing, that the plate 77 is located at a surface of the simulator and is not shielded by the metal can which covers other portions of the simulator. In the same manner, as will be discussed shortly, the lamp 21 at the lower part of FIG. 2 is located next to an opening covered by a transparent window so that it can be sensed by the light pickup means of the test station.

After 600 milliseconds, the relay K18 becomes disabled, its contacts RK18a close and its contacts RK18b open, and the capacitor C13 charges again.

Referring again to FIG. 4, only one of relays K7 and K8 becomes energized depending Upon whether the voltage supplied by power supply 55 is positive or negative. (Relay K8 closes for positive values of voltage). Note the presence of the oppositely poled diodes in series with these relays.

Referring back to FIG. 2, when relay K16 becomes energized, as one of the relays K7 and K8 is also energized, there is a direct current path through one pair of the pairs of contacts RK7 and RK8 and through contacts RK16, to the parallel paths containing relays K19 and K10. Now relay K19 becomes energized for approximately 600 milliseconds and then it becomes disabled and relay K10 becomes energized. The operation here is quite analogous to that just discussed for relays K18 and K16. When relay K19 becomes energized, its contacts RK19a open and its other contacts RK19B close so that capacitor C13 discharges into the transformer 73 and another simulated arc occurs.

The process above continues until a total of five arcs are simulated. Also, when the last relay K17 finally closes, the lamp 21 which simulates stray light emission lights up. If all five arcs are simulated and light is detected at an appropriate level, this is an indication that the testing system station such as 70 (or 68) to which the simulator is connected, is operating properly. If less than five arcs are simulated, this is an indication that there is something wrong at the test station. For example, if no arcs are formed, this is an indication that something is wrong within the power supply 57 which applies the anode voltage or in the connection between this power supply and the P2 terminal of the kinescope simulator. Thus, in response to the absence of any arc simulated by the kinescope simulator, the computer will cause the printer associated therewith to print out a message to the effect that there is a failure in the anode power supply circuit. In a similar manner, the simulation of only a single arc rather than five such arcs is indicative of a failure in the circuit 55 (FIG. 4) which applies a high voltage to the focusing grid G3 of the kinescopes being tested, and so on.

Figure 5:
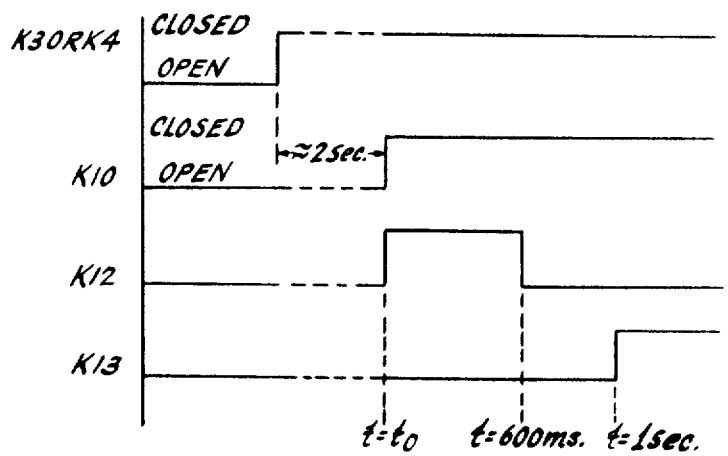
FIG. 5 is a drawing of waveforms to help explain the operation of the simulator of the invention.

FIG. 5 is a drawing of waveforms to help explain the operation of one group of relays within the dashed block 19 of FIG. 2. The group of relays chosen for illustration is K3 or K4, K10, K12, K13. Other groups of relays operate in a similar manner, as should be clear from the various examples discussed.

An important feature of the present invention is the ability to simulate high voltage operation of a kinescope under abnormal operating conditions without destroying the simulating device. When actually testing a kinescope, high input voltage of the order of 30,000 volts is applied to the kinescope anode to determine whether the kinescope arcs internally. As explained in detail in the copending application, the high voltage test station includes means for detecting and counting the number of such arcs which form. It is important that this arc detecting means be continuously tested to see whether it is operating correctly and if it were necessary to employ a reference kinescope to check the operation of the arc detecting means, the continuous application of overvoltages would soon destroy this reference kinescope.

As should be clear from the discussion above, when the simulator is in place, while high voltages are received at the certain of the simulator input terminals, it is not necessary to employ high voltages internally of the simulator to simulate the generation of arcs or light emission. Further, even if abnormally high voltages appear at a test station, which voltages would be capable of damaging a "reference" kinescope, they do not damage or destroy the simulator. Referring to FIG. 4, high impedances such as R3 and R9 within the simulator make the high voltage supply sources appear to the circuits within the simulator as ideal current sources. Thus, regardless of the value of the voltage provided by a high voltage supply, even one which is abnormally high, the actual amount of current flowing in a relay such as K9 is small and does not exceed the current rating of the relay. The voltage appearing across relays such as K1 to K9 is generally in the under 10 volt range.

When a kinescope is being tested at a high voltage test station, if abnormal conditions exist at the test station, certain combination of voltages may cause the kinescope to draw excessive current from one or more of the test systems power supplies, causing damage to the test system as well as destroying the kinescope. This may occur, for example, if a positive voltage is erroneously applied to the control grid, causing excessive plate current. An important advantage of employing the simulator of the present invention rather than a reference kinescope is the avoidance of this type of operation. The simulator is not an active device. If there is a fault present in the test system, this cannot cause other faults in the simulator, of the type discussed above, which would mask the initial fault and which, in turn, could cause damage to the test station itself.

What I claim is:

1. A simulator of a kinescope comprising, in combination:
   means responsive to a group of signals applied to the simulator for producing outputs representing normal voltages and currents produced by the kinescope in response to such signals; and
   means responsive to another group of signals applied to the simulator for producing sudden changes in voltage level which, while not causing any arc to be formed, simulates internal arcing in a kinescope.

2. A simulator as set forth in claim 1 and further including:
   means responsive to a group of signals applied to the simulator for simulating light emission from an electrode of a kinescope.